UNITED STATES PATENT OFFICE.

JOHN HALL O'DELL, OF OAKLAND, CALIFORNIA, ASSIGNOR TO INTERNATIONAL EGG COMPANY, INC., OF NEW YORK, N. Y., A CORPORATION OF NEW YORK.

COMPOSITION FOR PRESERVING EGGS.

1,194,340.  Specification of Letters Patent.  Patented Aug. 8, 1916.

No Drawing.  Application filed August 30, 1915.  Serial No. 47,945.

*To all whom it may concern:*

Be it known that I, JOHN HALL O'DELL, a citizen of the United States, and a resident of Oakland, in the county of Alameda and State of California, have invented a new and Improved Composition for Preserving Eggs, of which the following is a full, clear, and exact description.

My invention relates to a composition for preserving eggs.

It is simple and inexpensive, can be easily applied to eggs, and will effectively protect them without reducing the marketable qualities of the eggs as to their appearance or taste.

The object of the invention is to provide a simple and inexpensive composition for efficiently preserving eggs.

The composition is in the form of a liquid, the body of which is an oil, to which wax and gum are added. All of the substances used for the composition must be odorless or deodorized before the solution is made. The ingredients giving the best results are refined mineral oil having a specific gravity of about .85. The oil I use is the Standard Oil Company's product known on the market as "Socony." It is a mineral oil having a specific gravity of about .85 and substantially colorless and odorless. The odorless wax used is Japanese or palm wax. It is understood that other wax may be used provided it is odorless or deodorized. The gum used in the composition is the gum of the cherry tree.

The proportions in which the ingredients are used are as follows: For every ten gallons of oil, one pound of wax and one pound of gum are used, which will make substantially 97.748% of oil, 1.126% of wax, and 1.126% of gum. The wax is dissolved in a little oil by raising the temperature of the oil, and then pouring the mixture into the oil body. The gum is similarly dissolved in a little hot oil before it is mixed with the body of oil. The solution so formed is then ready, and the eggs may be dipped therein to receive a coating, which when dried upon the egg will preserve the same.

In place of using the substantially colorless light oil, heavier oil may be used, in which case, a lighter oil, such as petrolatum, is added to reduce the specific gravity of the heavier oil. In all cases the oil used should be colorless and odorless. The quantity of wax and gum may be varied, but in all events it should be such as not to render the coating formed on the egg too brittle, as would be the case if too much wax were added, or too soft, as when there is not enough. Similarly, an excess of gum renders the coating formed too sticky, while a deficiency thereof will not produce a perfectly adhering coating.

When eggs are coated with a composition as described, the resulting coating on the eggs not only perfectly preserves the eggs but it in no way diminishes the marketable qualities of the eggs, for the odorless ingredients constituting the coating for the eggs in no way affect the taste of the eggs, and the thin film of coating is imperceptible to the eye, as it is colorless.

I claim:

1. A composition for preserving eggs consisting of a solution of wax and gum in mineral oil in substantially the proportions described.

2. A composition for preserving eggs consisting of a solution of odorless wax and odorless gum in a substantially colorless oil and substantially in the proportions described.

3. A composition for preserving eggs, consisting of a colorless oil, the specific gravity of which is substantially .85, Japanese wax and an odorless gum substantially in the proportions described.

4. A composition for preserving eggs, consisting of a colorless oil, the specific gravity of which is substantially .85, Japanese wax, and the gum of the cherry tree substantially in the proportions described.

In testimony whereof I have signed my name to this specification in the presence of two subscribing witnesses.

JOHN HALL O'DELL.

Witnesses:
B. JOFFE,
HELEN I. GORMAN.